United States Patent
Nakagawa

(10) Patent No.: US 10,156,390 B2
(45) Date of Patent: Dec. 18, 2018

(54) HEAT STORAGE APPARATUS AND AIR CONDITIONER HAVING SAME

(71) Applicant: SAMSUNG ELECTRONICS CO., LTD., Suwon-si (KR)

(72) Inventor: Tadahiro Nakagawa, Yokohama (JP)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/516,237

(22) PCT Filed: Oct. 28, 2015

(86) PCT No.: PCT/KR2015/011437
§ 371 (c)(1),
(2) Date: Mar. 31, 2017

(87) PCT Pub. No.: WO2016/068601
PCT Pub. Date: May 6, 2016

(65) Prior Publication Data
US 2018/0231278 A1    Aug. 16, 2018

(30) Foreign Application Priority Data

Oct. 28, 2014   (JP) .................................. 2014-219625
Nov. 28, 2014   (JP) .................................. 2014-240877
(Continued)

(51) Int. Cl.
*F25B 31/00* (2006.01)
*F24F 1/10* (2011.01)
(Continued)

(52) U.S. Cl.
CPC .............. *F25B 31/006* (2013.01); *F24F 1/10* (2013.01); *F25B 13/00* (2013.01); *F25B 47/022* (2013.01);
(Continued)

(58) Field of Classification Search
CPC ............ F25B 31/006; F25B 2313/0251; F25B 47/022; F25B 2313/0253; F24F 1/10; F24F 5/00; F24F 5/0017; Y02E 60/142
See application file for complete search history.

(56) References Cited

FOREIGN PATENT DOCUMENTS

EP      2 535 665 A1    12/2012
EP      2 613 107 A1     7/2013
(Continued)

OTHER PUBLICATIONS

International Search Report dated Feb. 17, 2016 in corresponding International Application No. PCT/KR2015/011437.
(Continued)

*Primary Examiner* — Emmanuel Duke
(74) *Attorney, Agent, or Firm* — Staas & Halsey LLP

(57) ABSTRACT

An air conditioner includes a heat storage apparatus for storing heat emitted from a compressor arranged in an outdoor unit, wherein the heat storage apparatus includes a heat storage tank installed in the compressor for storing heat emitted from the compressor and a heat transfer member configured to deliver heat emitted from the compressor to the heat storage tank, wherein the heat storage tank includes a first heat transfer face configured to have a form corresponding to a part of an outer circumferential face of the compressor to come into contact with the outer circumferential face of the compressor and a pair of second heat transfer faces configured to extend from both ends of the first heat transfer face to be in parallel to each other and form space with the outer circumferential face of the compressor, and wherein the heat transfer member is arranged in the space.

20 Claims, 14 Drawing Sheets

(30) Foreign Application Priority Data

Mar. 9, 2015 (JP) ................................ 2015-046369
Oct. 28, 2015 (KR) ........................ 10-2015-0149900

(51) Int. Cl.
*F25B 47/02* (2006.01)
*F25B 13/00* (2006.01)

(52) U.S. Cl.
CPC .............. *F25B 2313/0251* (2013.01); *F25B 2313/0253* (2013.01)

(56) References Cited

FOREIGN PATENT DOCUMENTS

| EP | 2613107 A1 * | 7/2013 | ............ F25B 31/006 |
|---|---|---|---|
| JP | 2012-78012 | 4/2012 | |
| JP | 2014-102040 | 6/2014 | |
| KR | 10-2004-0040204 | 5/2004 | |
| KR | 10-2012-0125288 | 11/2012 | |
| KR | 102013-0108274 | 10/2013 | |

OTHER PUBLICATIONS

Written Opinion of the International Searching Authority, PCT/ISA/237, dated Feb. 17, 2016 in corresponding International Application No. PCT/KR2015/011437.
European Office Action dated Aug. 24, 2017, in European Patent Application No. 15 853 820.7.
European Search Report dated Aug. 4, 2017, in European Patent Application No. 15853820.7.
European Office Action dated Oct. 12, 2018 in corresponding European Patent Application No. 15 853 820.7.

* cited by examiner

[Fig. 1]
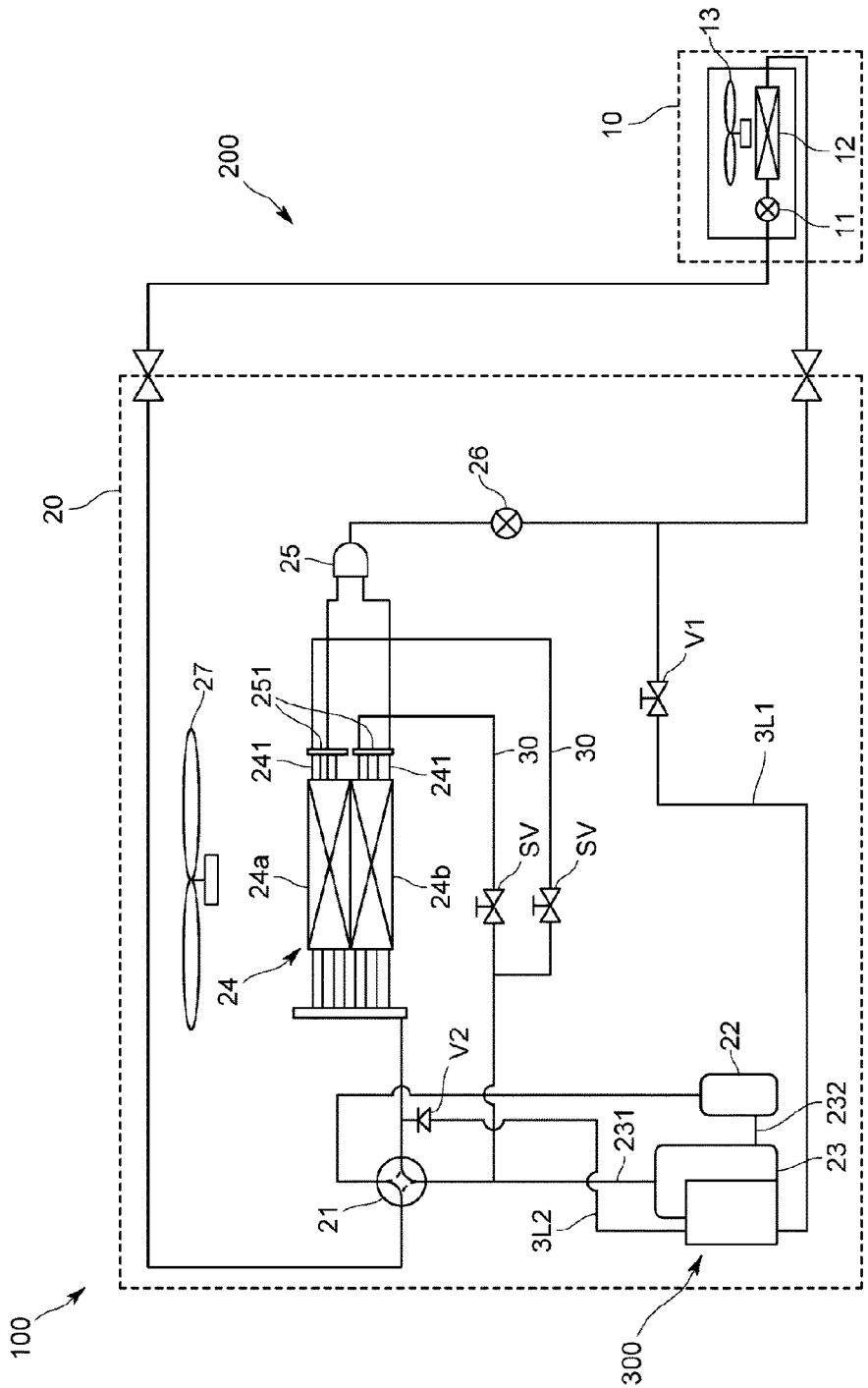

[Fig. 2]
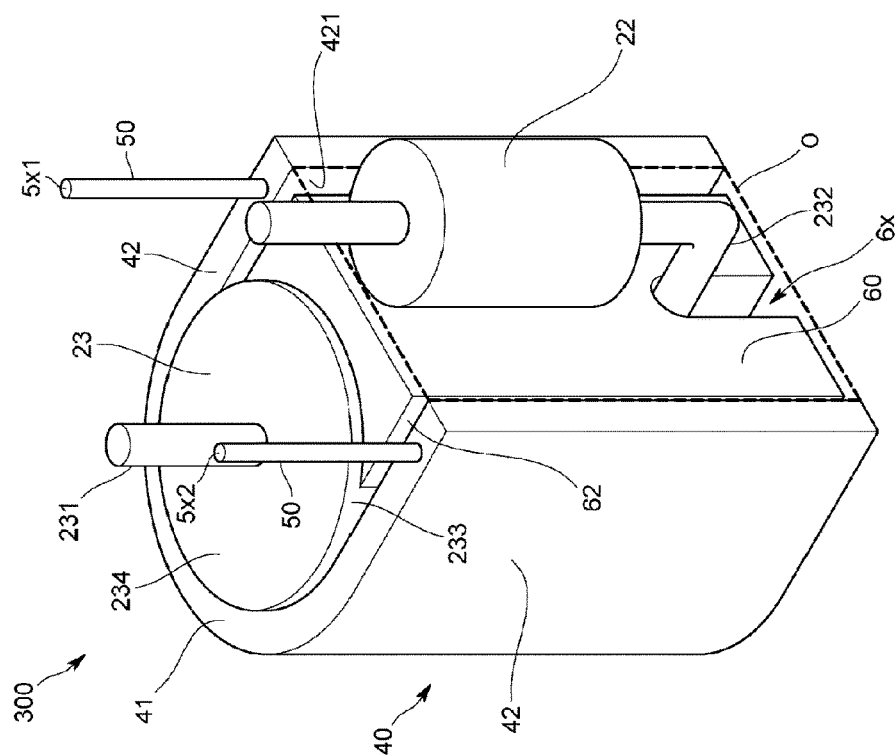

[Fig. 3]
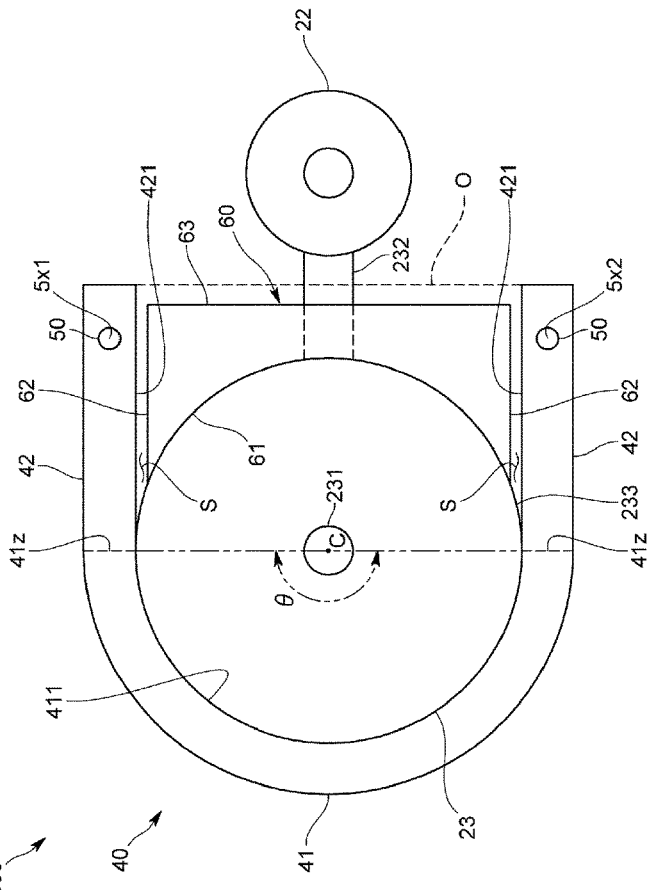
[Fig. 4]
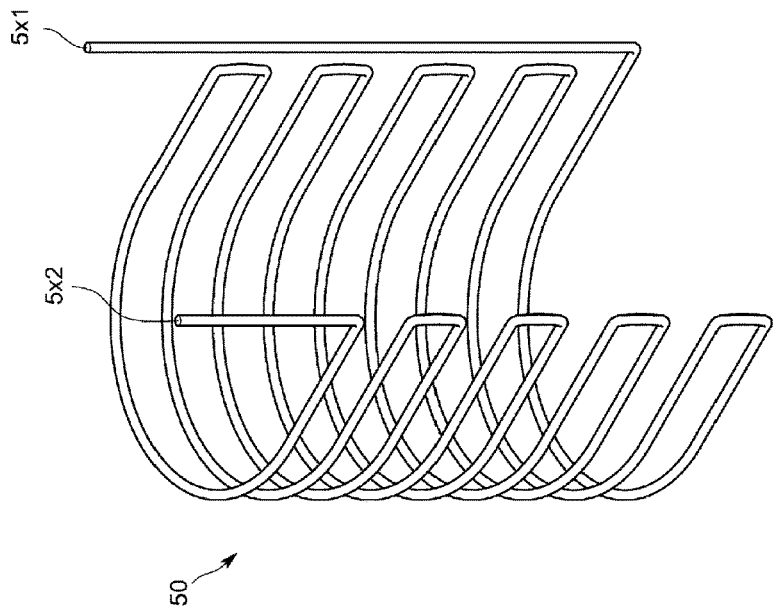

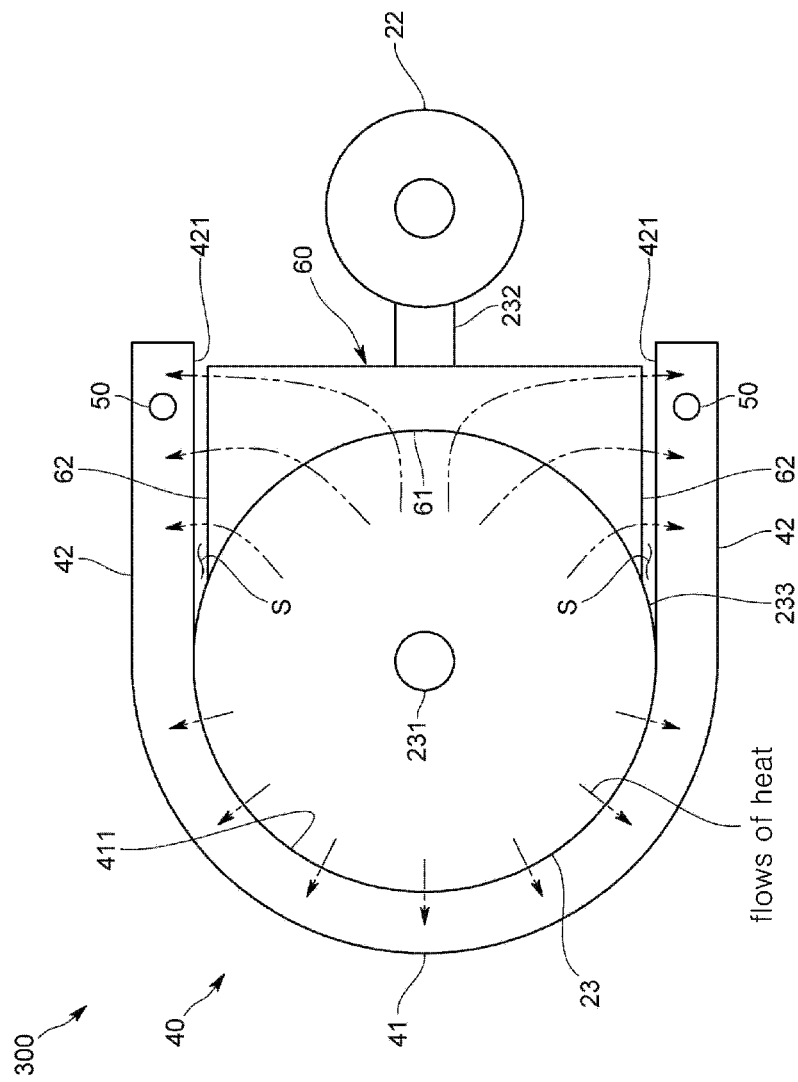
[Fig. 5]

[Fig. 6]
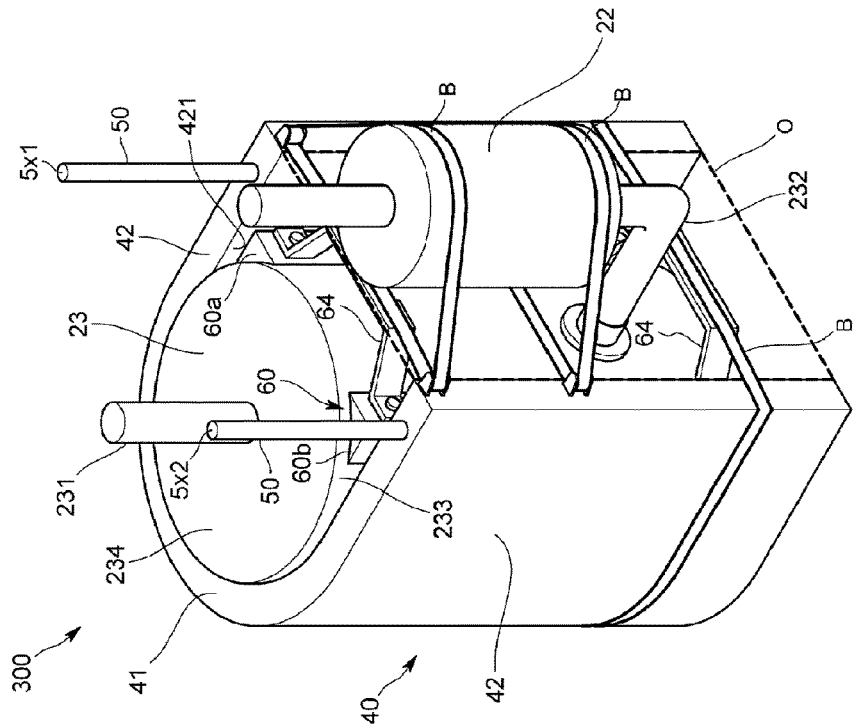
[Fig. 7]
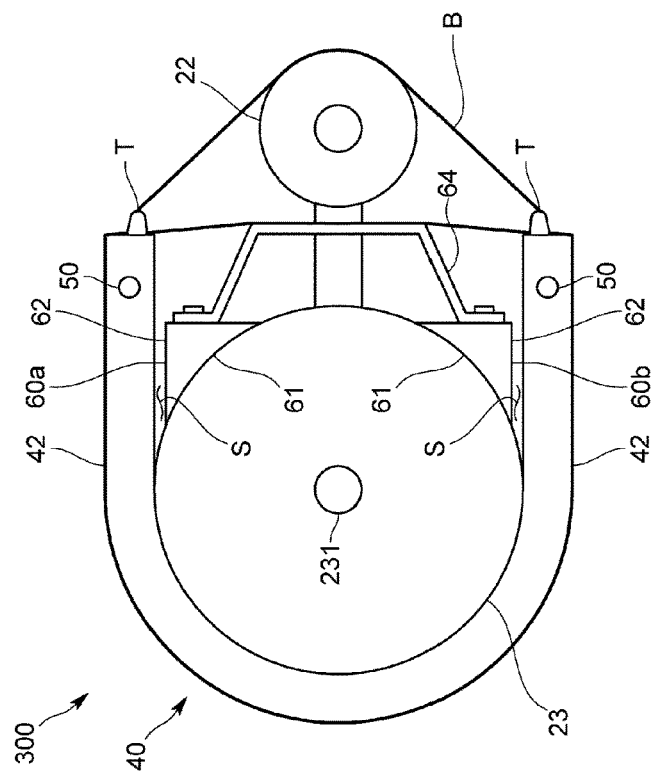

[Fig. 8]
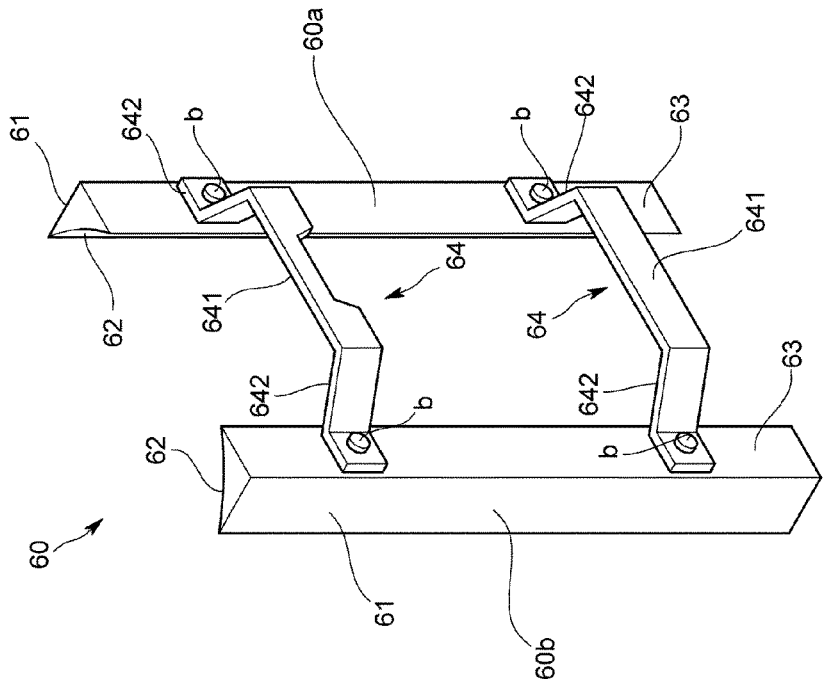
[Fig. 9]
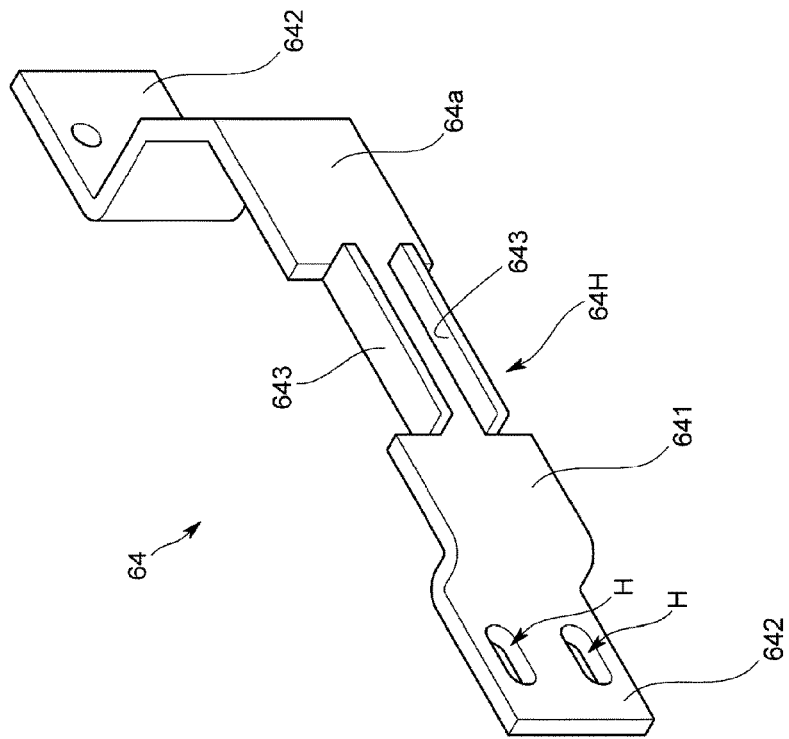

[Fig. 10]
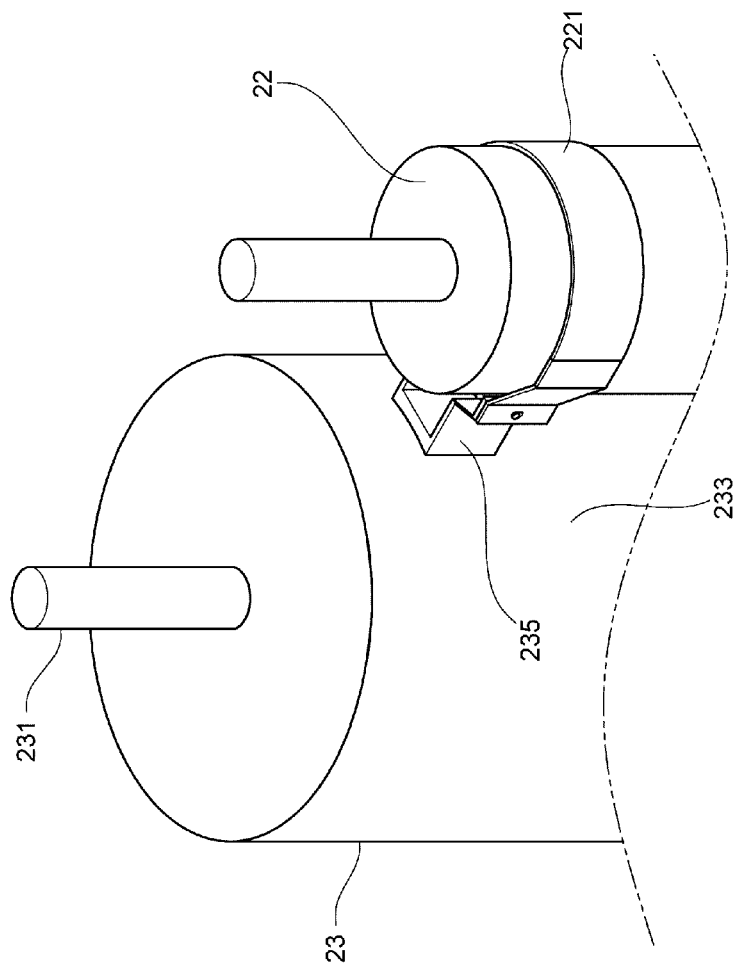

[Fig. 12]
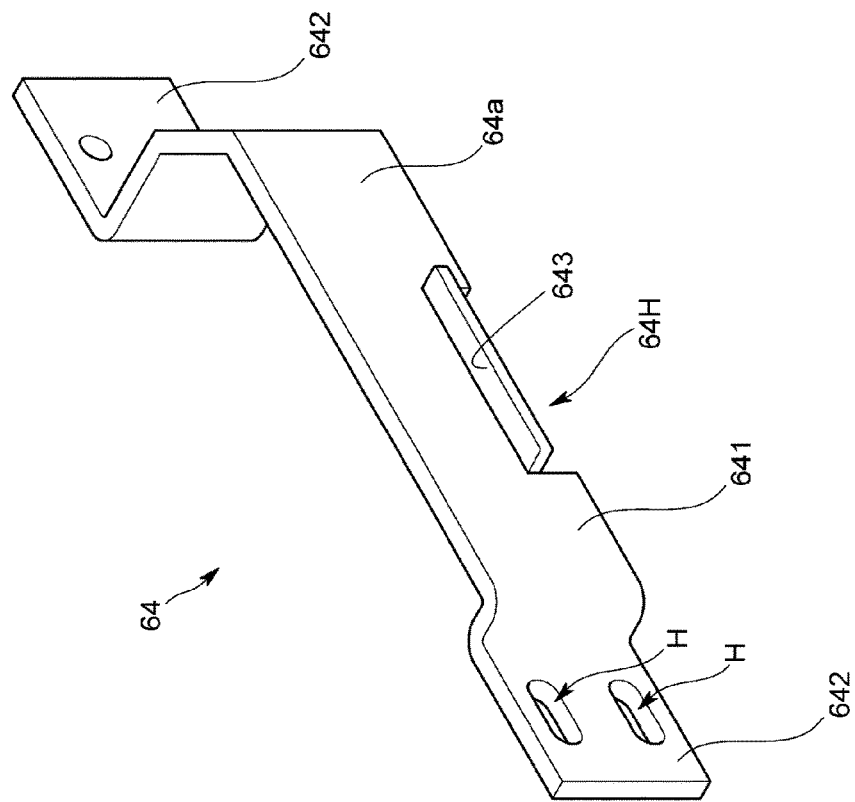

[Fig. 13]
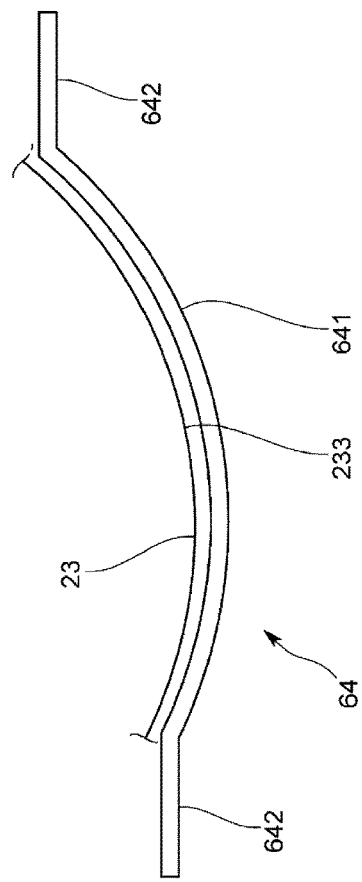
[Fig. 14]
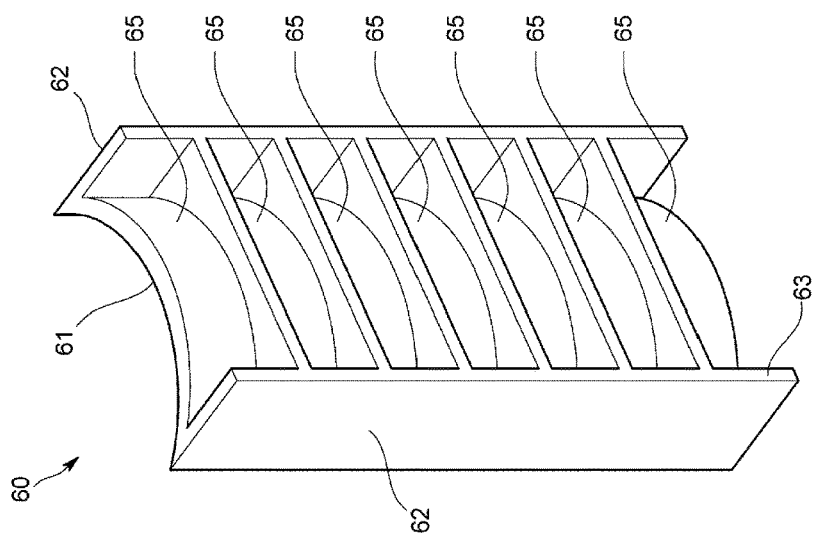

[Fig. 15]
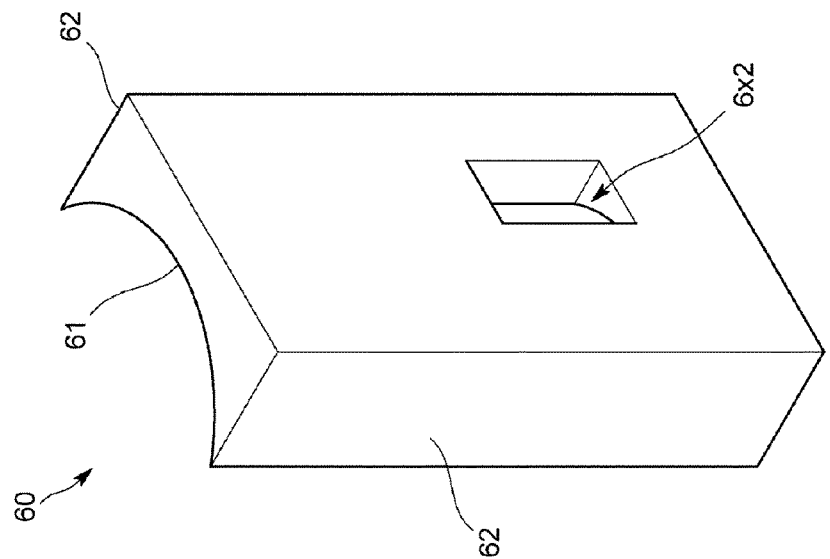
[Fig. 16]
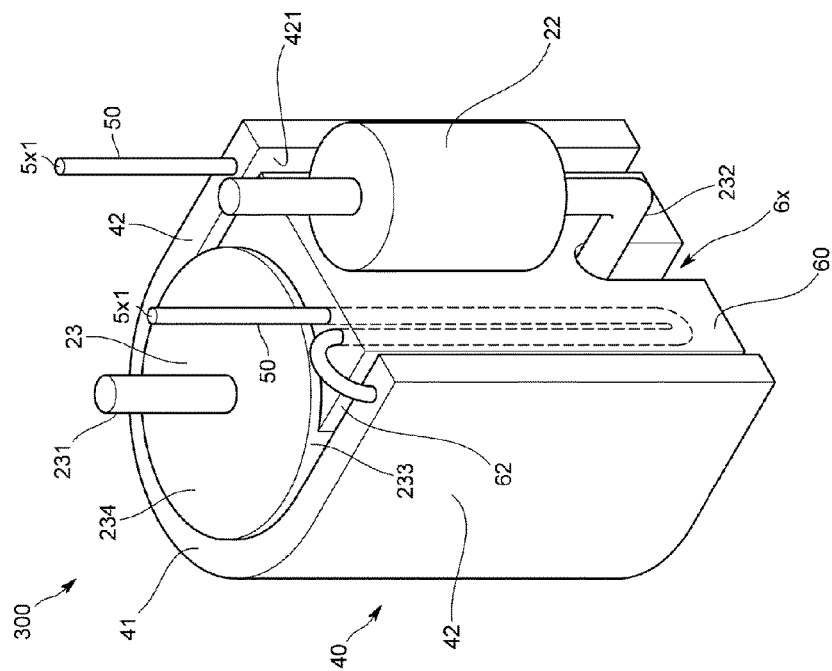

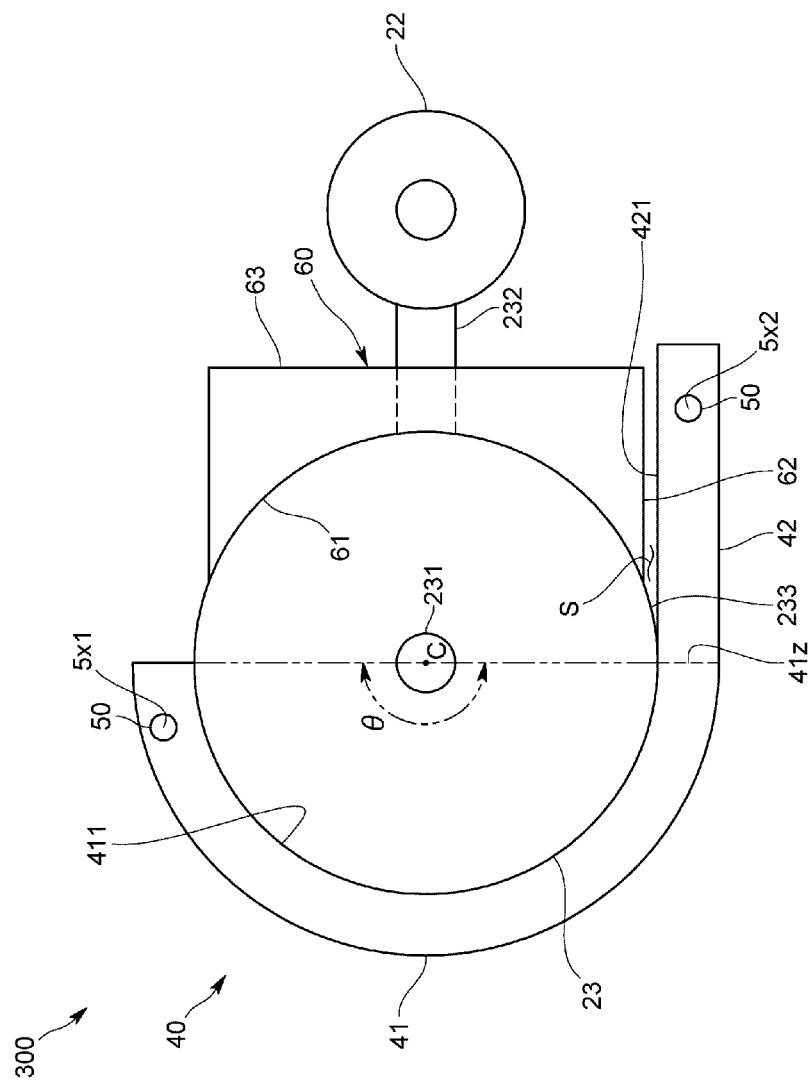
[Fig. 17]

[Fig. 18]
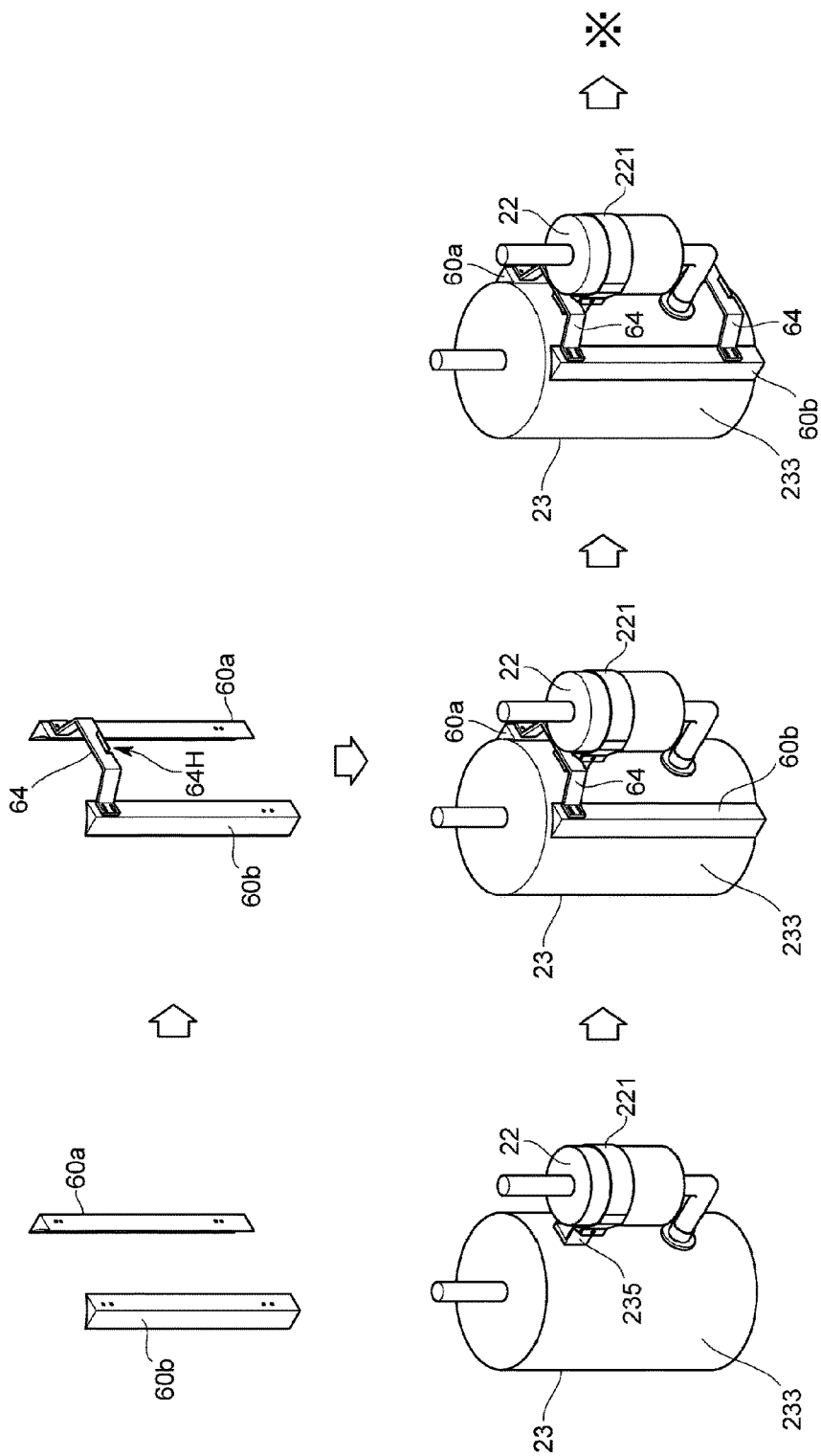

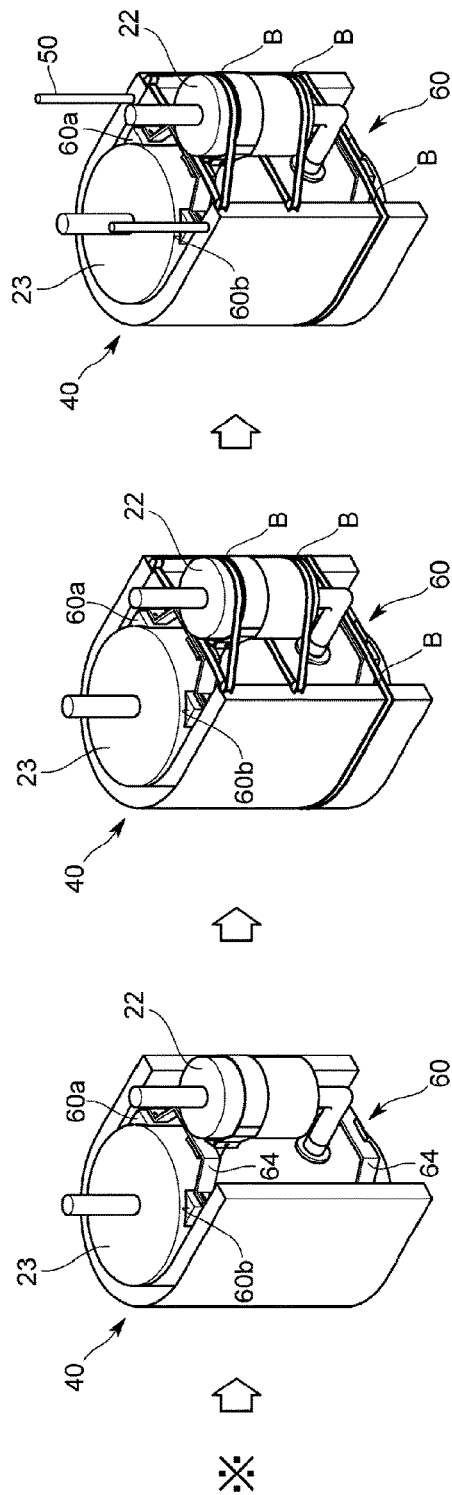
[Fig. 19]

HEAT STORAGE APPARATUS AND AIR CONDITIONER HAVING SAME

CROSS-REFERENCE TO RELATED APPLICATIONS

This application is a U.S. National Stage Application, which claims the benefit under 35 U.S.C. § 371 of PCT International Patent Application No. PCT/KR2015/011437, filed Oct. 28, 2015, which claims the foreign priority benefit under 35 U.S.C. § 119 of Japanese Patent Application No. 2014-219625, filed Oct. 28, 2014, Japanese Patent Application No. 2014-240877, filed Nov. 28, 2014, Japanese Patent Application No. 2015-046369, filed Mar. 9, 2015, and Korean Patent Application No. 10-2015-0149900, filed Oct. 28, 2015, the contents of which are incorporated herein by reference.

TECHNICAL FIELD

The present invention relates to a heat storage apparatus equipped in a compressor of a refrigeration cycle, and an air conditioner using the heat storage apparatus.

BACKGROUND ART

In general, a heat storage apparatus is a device installed around a compressor for storing heat emitted from the compressor, including a heat storage tank installed around the compressor for storing the heat emitted from the compressor and a refrigerant pipe installed inside the heat storage tank, through which a refrigerant flows, the refrigerant flowing in the refrigerant pipe heated by the heat stored in the heat storage tank.

Since the heat storage tank is arranged to enclose more than half of the outer circumferential face of the compressor, the heat storage tank is installed in the compressor by placing the heat storage tank on the top of the compressor and then moving the heat storage tank down.

In order to easily install the heat storage tank in the compressor, the diameter of the inner circumferential face of the heat storage tank has to be designed to be larger than that of the outer circumferential face of the compressor, in which case where the diameter of the inner circumferential face of the heat storage tank is larger than that of the outer circumferential face of the compressor, when the heat storage tank is installed in the compressor, there is a gap formed between the inner circumferential face of the heat storage tank and the outer circumferential face of the compressor, and some of the heat emitted from the compressor comes out through the gap between the inner circumferential face of the heat storage tank and the outer circumferential face of the compressor, hindering efficient storage of the heat emitted from the compressor.

DISCLOSURE

Technical Problem

An aspect of the present invention provides a heat storage apparatus capable of efficiently storing heat emitted from a compressor and air conditioner having the heat storage apparatus.

Technical Solution

In accordance with one aspect of the present disclosure, an air conditioner includes a heat storage apparatus for storing heat emitted from a compressor arranged in an outdoor unit, wherein the heat storage apparatus includes a heat storage tank installed in the compressor for storing heat emitted from the compressor and a heat transfer member configured to deliver heat emitted from the compressor to the heat storage tank, wherein the heat storage tank includes a first heat transfer face configured to have a form corresponding to a part of an outer circumferential face of the compressor to come into contact with the outer circumferential face of the compressor and a pair of second heat transfer faces configured to extend from both ends of the first heat transfer face to be in parallel to each other and form space with the outer circumferential face of the compressor, and wherein the heat transfer member is arranged in the space.

The first heat transfer face may be formed to come into contact with less than half of the outer circumferential face of the compressor, a gap between the pair of second heat transfer faces may be larger than diameter of the compressor.

The heat transfer member may comprise a compressor faced face arranged to face the outer circumferential face of the compressor for receiving heat emitted from the compressor, and a pair of heat storage tank faced faces arranged to face the pair of second heat transfer faces for delivering the heat received through the compressor faced face to the heat storage tank, and the compressor faced face may face a part of the outer circumferential face of the compressor between the pair of second heat transfer faces while the heat storage tank is installed in the compressor.

An accumulator may be installed in an inlet pipe through which a refrigerant flows into the compressor, and the heat transfer member may be arranged in the space to be apart from the accumulator.

The heat transfer member may be comprised of a plurality of heat transfer elements equipped in the compressor in the space, the heat transfer member further may comprise a connection member connecting the plurality of heat transfer elements.

The connection member may be mounted on an installation part installed on the outer circumferential face of the compressor for allowing the plurality of heat transfer elements to be positioned against the compressor.

The plurality of heat transfer elements may be fixed to the connection member by bolts.

The connection member may comprise a plurality of through holes through which the bolts pass, and at least one of the plurality of through holes has the form of a slit-shaped ellipse.

The connection member may comprise a projection protruding outwardly from an opposite face of the face to which the plurality of heat transfer elements are fixed, and a notch formed below the projection, and the notch may be combined with the installation part to position the connection member against the compressor.

The accumulator may be supported against the installation part installed on the outer circumferential face of the compressor.

Further may comprise a fixing member to fix the heat transfer member and the heat storage tank, wherein the fixing member presses the heat transfer member toward the compressor to adhere the heat storage tank and heat transfer member to the compressor.

The projection may comprise upper and lower projections and the fixing member makes contacts between the upper and lower projections to press the connection member toward the compressor and press the heat transfer member toward the compressor by the connection member pressed toward the compressor.

The heat transfer member may be a metal with heat conductivity of more than 50 W/mK.

The heat transfer member may be configured to have a thin plate formed along a side to another of the pair of heat storage tank faced faces.

A heat exchanger for heat storage formed of a member in the shape of a pipe in the heat storage tank for allowing a refrigerant flowing inside to change heat with a heat storage member contained in the heat storage tank is arranged, and a part of the pipe forming the heat exchanger for heat storage may pass through the inside of the heat transfer member.

Advantageous Effects

According to embodiments of the present invention, heat emitted from a compressor may be efficiently stored.

DESCRIPTION OF DRAWINGS

FIG. 1 is a block diagram of an air conditioner (AC), according to an embodiment of the present invention;

FIG. 2 is a perspective view of a heat storage apparatus, according to an embodiment of the present invention;

FIG. 3 is a plan view of a heat storage apparatus, according to an embodiment of the present invention;

FIG. 4 is a heat exchanger for heat storage, according to an embodiment of the present invention;

FIG. 5 shows heat emitted from a compressor being delivered to a heat storage tank, according to an embodiment of the present invention;

FIG. 6 is a perspective view of a heat storage apparatus, according to another embodiment of the present invention;

FIG. 7 is a plan view of a heat storage apparatus, according to another embodiment of the present invention;

FIG. 8 shows a heat transfer member fixed to a connection member, according to another embodiment of the present invention;

FIG. 9 shows a pair of projections formed on a connection member, according to another embodiment of the present invention;

FIG. 10 shows an accumulator supported on an installation part formed on the outer circumferential face of a compressor, according to another embodiment of the present invention;

FIG. 11 (b) shows a heat transfer member pressed against a compressor by a fixing member, according to another embodiment of the present invention;

FIG. 12 shows a single projection formed on a connection member, according to another embodiment of the present invention;

FIG. 13 shows a connection member, according to another embodiment of the present disclosure;

FIG. 14 shows a heat transfer member, according to another embodiment of the present disclosure;

FIG. 15 shows a heat transfer member, according to another embodiment of the present disclosure;

FIG. 16 is a perspective view of a heat storage apparatus, according to another embodiment of the present invention;

FIG. 17 is a plan view of a heat storage apparatus, according to another embodiment of the present invention; and FIGS. 18 and 19 show a procedure of assembling a heat storage apparatus, according to an embodiment of the present invention.

BEST MODE

Figure 11A:
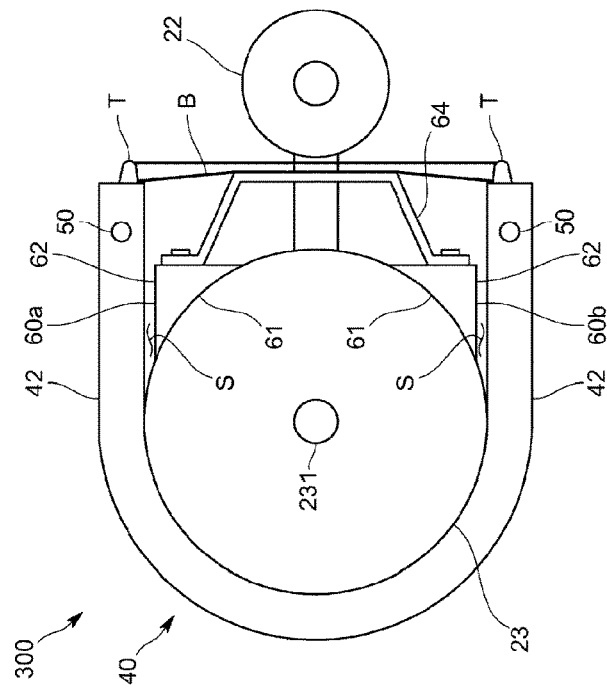
FIG. 11 (a) shows a heat transfer member pressed against a compressor by a fixing member, according to an embodiment of the present invention.

An embodiment of a heat storage apparatus and an air conditioner (AC) having the same will now be described with reference to accompanying drawings.

An AC 100 with respect to the present embodiment includes, as shown in FIG. 1, an indoor unit 10, an outdoor unit 20, a refrigeration cycle 200 for circulating a refrigerant in the indoor unit 10 and outdoor unit 20 (hereinafter, referred to as a refrigeration circuit 200).

There are a decompressing means 11, an indoor heat exchanger 12 connected to the decompressing means 11, and an indoor blower fan 13 installed in the indoor unit 10.

However, the decompressing means 11 are not necessarily installed.

There may be a four-way valve 21, an accumulator 22, a compressor 23, an outdoor heat exchanger 24, a distributor 25, an expansion valve 26, and an outdoor blower 27 installed in the outdoor unit 20.

The refrigeration circuit 200 is configured to be able to switch between cooling and heating operations by controlling opening and closing of four ports in the four-way valve 21 to reverse the flow of refrigerant. Specifically, the four-way valve 21 may be controlled for the refrigerant discharged from the compressor 23 to flow into the outdoor heat exchanger 24 during the cooling operation, and controlled for the refrigerant discharged from the compressor 23 to flow into the indoor heat exchanger 12 during the heating operation.

In the embodiment, as shown in FIG. 1, a bypass pipe 30 having one end connected to an outlet pipe 231 and the other end connected to a heat transfer pipe 241 of the outdoor heat exchanger 24 is installed.

Furthermore, in the embodiment, a plurality of heat transfer pipes 241 are connected to an auxiliary distributor 251, and the other end of the bypass pipe 30 is connected to the heat transfer pipes 241 through the auxiliary distributor 251.

An opening/closing valve SV is installed in the bypass pipe 30, and a controller (not shown) is configured to control the opening/closing valve SV to switch the bypass pipe 30 into an opened state or closed state.

More specifically, the controller receives a temperature signal from a temperature sensor (not shown) installed in the outdoor heat exchanger 24, and sends a control signal to the opening/closing valve SV to switch the bypass pipe 30 into the opened state from the closed state if the temperature of the outdoor heat exchanger 24 falls below a certain temperature. This enables the refrigerant discharged from the compressor 23 to flow through the bypass pipe 30 to the outdoor heat exchanger 24, defrosting the outdoor heat exchanger 24.

Furthermore, in the AC 100 of the embodiment, the outdoor heat exchanger 24 is divided into a plurality of heat exchanger elements 24a, 24b, and bypass pipes 30 and opening/closing valves SV corresponding to the respective heat exchanger elements 24a, 24b are installed.

This may continue the heating operation with the heat exchanger element 24b in one direction while defrosting with the heat exchanger element 24a in the other direction.

Here, the AC 100 of the embodiment may include a heat storage apparatus 300 for storing heat emitted from the compressor 23, as shown in FIGS. 1 to 3.

To further explain the compressor 23 before describing the heat storage apparatus 300, as shown in FIGS. 2 and 3, the compressor 23 has the shape of a tub connected to an inlet pipe 232 through which the refrigerant flows in the compressor 23 and an outlet pipe 231 through which the refrigerant is discharged from the compressor, and here, the compressor 23 has almost a cylindrical form with the inlet pipe 232 connected to the outer circumferential face 233 and the outlet pipe 231 connected to the top face 234.

Furthermore, in the embodiment, the accumulator 22 is installed in the inlet pipe 232.

The heat storage apparatus 300 will now be described in detail.

In the embodiment, as shown in FIGS. 2 and 3, the heat storage apparatus 30 is formed by including a heat storage tank 40 installed in the compressor 23, a heat exchanger for heat storage 50 installed in the heat storage tank 40, and a heat transfer member 60 arranged between the compressor 23 and the heat storage tank 40.

The heat storage tank 40 may be installed around the compressor 23, receiving a heat storage member (not shown) inside, such as a liquid and storing heat emitted from the compressor 23, and may be formed of e.g., a resin that makes it lighter and inexpensive.

Specifically, as shown in FIG. 3, the heat storage tank 40 may include a first element 41 having a first heat transfer face 411 making a form along a circumferential part of the outer circumferential face 233 of the compressor 23, and a second element 42 having a second heat transfer face 421 formed continuously from the first heat transfer face 411 and formed integrally from circumferential ends 41z of the first element 41.

More specifically, the first element 41 is configured to have a partially cylindrical form, the diameter of the inner circumferential face thereof almost corresponding to the diameter of the outer circumferential face 233 of the compressor 23.

In the embodiment, the first element 41 has the form of a half cylinder while the second element 42 is formed as if extending from each of the both circumferential ends 41z of the first element 41 along the tangential direction, so the heat storage tank 40 has the form of almost a letter 'U' when viewed from above.

In other words, the first element 41 of the embodiment is configured to have the both circumferential ends 41z form an angle θ of about 180 degrees with respect to a center axis C of the compressor 23 while the heat storage tank 40 is installed in the compressor 23.

The first and second heat transfer faces 411 and 421 will now be described with reference to FIG. 3.

The first heat transfer face 411 is a curved face set on the inner circumferential face of the first element 41, and configured to come into contact with a circumferential part of the outer circumferential face 233 of the compressor 23 while the heat storage tank 40 is installed in the compressor 23.

As described above, since the first element 41 has the form of a half cylinder, the first heat transfer face 411 may come into contact with less than half of the outer circumferential face 233 of the compressor 23.

An elastic material, such as thermal insulating grease or sheet may be included between the first heat transfer face 411 and the outer circumferential face 233 of the compressor 23, to reduce a thermal contact resistance between the first heat transfer face 411 and the outer circumferential face 233 of the compressor 23.

The second heat transfer face 421 is a plane set on the plate of the second element 42, and formed continuously from each of the both circumferential ends of the first heat transfer face 411, both second heat transfer faces 421 being formed in parallel to each other.

Each of the second heat transfer faces 421 is configured to form a space S with the outer circumferential face 233 of the compressor 23 and not to contact the outer circumferential face 233, while the heat storage tank 40 is installed in the compressor 23.

Like the second element 42, each second heat transfer face 421 extends from the circumferential end 41z of the first heat transfer face 411 along the tangential direction, and the distance between the pair of the second heat transfer faces 421 is set to be larger than the width of the compressor 23 (in the embodiment, the diameter of the outer circumferential face 233 of the compressor 23). Due to this, an installation opening O is formed between the second elements 42 for the heat storage tank 40 to be horizontally slid and installed into the compressor 23.

Furthermore, the installation opening O is an area formed to range from ends of the pair of heat transfer faces 421.

The heat exchanger for heat storage 50 is installed within the tub of the heat storage tank 40, as shown in FIGS. 2 and 4, and formed with a pipe-shaped member to exchange heat between the refrigerant flowing therein and a heat storage member received in the heat storage tank 40.

Specifically, this is e.g., a copper pipe with both ends open formed to go zigzag in the heat storage tank 40, and configured for the refrigerant to flow into one end opening 5x1 and flow out from the other end opening 5x2.

Here, the heat exchanger for heat storage 50 is arranged to pass through the first and second elements 41 and 42. More specifically, the both end openings 5x1, 5x2 are located on the top of the heat storage tank 40, and configured for the refrigerant flowing in through the one end opening 5x1 to flow down the heat storage tank 40 and then move zigzag toward the top to flow out of the other end opening 5x2.

In the embodiment, as shown in FIG. 1, the one end opening 5x1 is connected to a first heat storage pipe 3L1 branching off between the indoor heat exchanger 12 and the expansion valve 26 and having the opening/closing valve V1 installed therein. The other end opening 5x2 is connected to a second heat storage pipe 3L2 joining between the outdoor heat exchanger 24 and the four-way valve 21 and having a check valve V2 installed therein.

According to the aforementioned configuration, for example, a controller (not shown) sends a control signal to the opening/closing valve V1 to switch the first heat storage pipe 3L1 into the opened state from the closed state, so that some of the refrigerant flowing from the indoor heat exchanger 12 to the outdoor heat exchanger 24 flows into the heat exchanger for heat storage 50.

The refrigerant flowing into the heat exchanger for heat storage 50 is heated by the heat stored in the heat storage tank 40 and flows out through the other end opening 5x2, joining the refrigerant that has passed the outdoor heat exchanger 24 and sequentially flowing in the four-way valve 21, accumulator 22, and compressor 23.

As such, the refrigerant flowing out from the indoor heat exchanger 12 heated in the heat exchanger for heat storage 50 and then flowing into the compressor 23 has a higher temperature than when flowing into the compressor 23 without being heated on the way. In other words, in the embodiment, the temperature of the refrigerant discharged from the compressor 23 may increase depending on the amount of heat stored in the heat storage tank 40.

Accordingly, as much as the temperature of the refrigerant discharged from the compressor 23 increases, heating performance may be improved during the heating operation, defrosting time may be shortened during the defrosting operation, and heating performance may be further improved even when the heating operation is activated during the defrosting operation.

In the heat storage apparatus 300 of the embodiment, a heat transfer member 60 is equipped in the space S formed between the outer circumferential face 233 of the compressor 23 and the second heat transfer face 421.

The heat transfer member 60 transfers the heat emitted from the compressor 23 to the heat storage tank 40, thereby transferring the heat emitted from the compressor 23, the heat in particular emitted from a part of the outer circumferential face 233 of the compressor 23 that is not in contact with the heat storage tank 40, to the heat storage tank 40.

More specifically, as shown in FIGS. 2 and 3, it has a compressor faced face 61 facing the outer circumferential face 233 of the compressor 23 and a heat storage tank faced face 62 facing the second element 42 of the heat storage tank 40, and is configured to pass the heat delivered through the compressor faced face 61 from the compressor 23 to the heat storage tank 40 through the heat storage tank faced face 62.

Specifically, the heat transfer member 60 of the embodiment has a body of e.g., a metal block with a pair of heat storage tank faced faces 62 facing the respective second heat transfer faces 421 formed in parallel to each other and the compressor faced face 61 formed to range from one of the pair of heat storage tank faced faces 62 to the other. In other words, the heat transfer member 60 of the embodiment is installed from one side to the other side of the second heat transfer face 421 while being arranged in the space S.

Furthermore, the metal may have the same as or higher heat conductivity than the material forming the compressor. More specifically, for example, it may have heat conductivity of more than 50 W/mK, for which there may be materials like aluminum, steel, carbon steel, chrome steel, tungsten steel, manganese steel, copper, aluminum bronze, brass, nickel, chrome, cobalt, palladium, etc. Among them, aluminum in particular may be desirable in terms of processability, material cost, or weight.

The compressor faced face 61 has a shape depending on a part of the outer circumferential face 233 of the compressor 23 interposed between the pair of second heat transfer faces 421.

Accordingly, the compressor faced face 61 of the embodiment comes into contact with a part of the outer circumferential face 233 of the compressor 23 which is not in contact with the first heat transfer face 411 while the heat storage tank 40 is installed in the compressor 23.

With the configuration, the heat transfer member 60 and the heat storage tank 40 enclose almost the entire outer circumferential face 233 of the compressor 23.

A gap between the pair of heat storage tank faced faces 62 is set to be slightly less than the gap between the pair of second heat transfer faces 421, and the length of each heat storage tank faced face 62 is set to be less than that of the second heat transfer face 421. An elastic material, such as thermal insulating grease or sheet is placed between the heat storage tank faced face 62 and the second heat transfer face 421, to reduce the thermal contact resistance between the heat storage tank faced face 62 and the second heat transfer face 421.

Furthermore, in the embodiment, a back face 63 located in the opposite side to the compressor faced face 61 and formed between the respective heat storage tank faced faces 62 has the form of a plane.

This makes the heat transfer member 60 of the embodiment received between the installation opening O and the compressor 23 while arranged in the space S, not to be in contact with the accumulator 22.

Furthermore, the heat transfer member 60 of the embodiment has the bottom floor on which a groove 6x notched upward is formed, and is configured such that the inlet pipe 232 connected to the outer circumferential face 233 of the compressor 23 passes the groove 6x.

With this, the heat transfer member 60 is installed and positioned in the inlet pipe 232 from above, and in this state, slid horizontally to the compressor 23 to be arranged in the space S, allowing the compressor 23 to be put in between the heat transfer member 60 and the heat storage tank 40.

Subsequently, flows of heat during the heating operation or defrosting operation while the heat storage apparatus 100 of the embodiment is installed in the compressor 23 will be described with reference to FIG. 5.

Storing heat emitted from the compressor 23 in the heat storage tank 40 during the heating operation will be described first.

In this case, the opening/closing valve V1 of the first heat storage pipe 3L1 connected to the heat exchanger for heat storage 50 is closed. In this state, the heat generated from the compressor 23 is transferred to the heat storage tank 40 through the first heat transfer face 411 coming into contact with the outer circumferential face 233 of the compressor 23, and also flows to the heat transfer member 60 to be transferred to the heat storage tank 40 through the second heat transfer face 422.

As such, the heat storage apparatus 100 of the embodiment may transfer the heat generated from the compressor 23 to the heat storage tank 40 via two routes, and increase the heat storing rate, thereby shortening a heat storing period of time.

Next, an occasion when the heat stored in the heat storage tank 40 is radiated in the defrosting operation will be described. In this case, the opening/closing valve V1 of the first heat storage pipe 3L1 is opened. In this state, a two-phase low temperature refrigerant flows in through the one end opening 5x1f of the heat exchanger for heat storage 50 from the first heat storage pipe 3L1, and heat exchange is performed between the refrigerant and the heat storage member contained in the heat storage tank 40. The refrigerant vaporized by the heat exchange with the heat storage member flows out to the second heat storage pipe 3L2 through the other end opening 5x2 of the heat exchanger for heat storage 50.

In the embodiment, a flow of heat in the radiation of heat is the same as that in the storage of heat. This is because the temperature of the compressor 23 is always higher than the heat storage tank 40.

According to the AC 100 of the embodiment configured as described above, by installing the heat transfer member 60 in the space S formed between the outer circumferential face 233 of the compressor 23 and the second heat transfer face 421 of the heat storage tank 40, the heat transfer member 60 and the heat storage tank 40 may enclose almost the entire outer circumferential face 233 of the compressor 23.

This enables the outer circumferential face 411 of the compressor 23 to come into contact with the first heat transfer face 411, thereby improving the heat transfer efficiency, allowing the heat emitted from a part of the outer circumferential face 233 of the compressor 23 that is not in contact with the heat storage tank 40 to be delivered to the heat storage tank 40 through the heat transfer member 60, and efficiently storing the heat emitted from the compressor 23 within a short period of time with a simple configuration.

As described above, that fact that the heat emitted from the compressor 23 may be stored in the heat storage tank 40 enables the refrigerant flowing in the heat exchanger for heat storage 50 to be heated to a high temperature, thereby effectively utilizing energy and improving heating performance or defrosting efficiency of the AC 100.

Furthermore, since the heat storage tank 40 may be slid horizontally to be installed in the compressor 23 and the heat transfer member 60 may be slid horizontally to be arranged in the space S between the outer circumferential face 233 of the compressor 23 and the second heat transfer face 421, workability in assembling the heat storage apparatus 300 increases.

Moreover, since the second transfer faces 421 are formed in parallel to each other, the heat emitted from the compressor 23 may be delivered by the heat transfer member 60 to the heat storage tank 40 and material costs of the heat transfer member 60 may be saved, without increasing the size of the heat transfer member 60 built from one of the second heat transfer faces 421 to the other more than needs.

In addition, the heat storage tank 40 is composed of the first element 41 and the second element 42 formed continuously from the first element 41, making the manufacturing cost inexpensive and maintaining reliability in performance of the heat storage tank 40, compared with an occasion where the heat storage tank 40 are divided into multiple ones.

However, the present invention is not limited to the embodiments.

For example, in the AC of the aforementioned embodiment, although the heat transfer member is formed to range from one of the second heat transfer faces to the other, it is less necessary to use a high heat conductive metal for a part that does not contribute to heat transfer, so the heat transfer member 60 may be configured to have two heat transfer elements 60a, 60b arranged in the respective spaces S formed between the outer circumferential face 233 of the compressor 23 and the respective second heat transfer faces 421, as shown in FIGS. 6 to 8.

This may reduce the material cost of the heat transfer member 60 and effectively store the heat emitted from the compressor 23.

In the aforementioned configuration, to further improve the workability, as shown in FIGS. 6 to 8, it is desirable to further include a connection member 64 for connecting the two heat transfer elements 60a, 60b to each other.

To further describe the connection member 64, it is fixed to the respective heat transfer elements 60a, 60b by bolts b, as shown in FIG. 8 in particular, and is formed by bending e.g., a flat panel member and composed of a center part 641 of the form of a flat panel and both ending parts 642 bent from the center part 641.

More specifically, the connection member 64 has through holes for the bolts b to be inserted thereto, and inner faces of the both ending parts 642 are the fixed faces to fix the heat transfer elements 60a, 60b.

With the configuration, the respective heat transfer elements 60a, 60b may be positioned in advance to be arranged in the respective spaces S, thereby improving assemblability of the heat storage apparatus 300.

Furthermore, since if the respective heat transfer elements 60a, 60b are rotated against the fixed faces, the respective heat transfer elements 60a, 60b may not be arranged well in the corresponding spaces S because they have different inclinations, fixing the respective heat transfer elements 60a, 60b by the bolts b, as described above, may prevent the respective heat transfer elements 60a, 60b from being rotated against the fixed faces and ensure the heat transfer member 60 to be easily and securely equipped therein.

Here, for example, if there is an error occurring in a manufacturing process and the distance between the heat transfer elements 60a, 60b is different from the designed value, the respective heat transfer elements 60a, 60b may not be equipped in the corresponding spaces S.

Accordingly, with the configuration of the connection member 64, it is desirable for e.g., the through hole H formed at one end 642, as shown in FIG. 9, to have the form of a long hole. Specifically, here, there are a plurality of through holes H formed to correspond to the bolts b at the one end 642, each through hole H having the form of an elongated hole. Furthermore, there is no need to have as many through holes H as the number of the bolts b, but for example, there may be one through hole H having the form of "⊏" and two or more bolts b inserted thereto.

With this configuration, the position of the heat transfer element 60b may be adjusted as the heat transfer element 60b may be moved along the through hole H having the form of an elongated hole fixed at the one end 642. This may ensure the respective heat transfer elements 60a, 60b to be arranged in the spaces S irrespective of the error in the manufacturing process and secure adhesion of the heat transfer member 60 against the heat storage tank 40 and compressor 23.

Moreover, to improve workability of installing the connection member 64 in the compressor 23, it is desirable to install an installation part 235, in which the connection member 64 is combined and equipped, on the outer circumferential face 233 of the compressor 23, as shown in FIG. 10.

In this case, the connection member 64 serves as a positioning tool to determine the positions of the respective heat transfer elements 60a, 60b against the compressor 23. The connection member 64 may be configured to have e.g., a notch 64H formed in the center part 641 of the connection member 64, as shown in FIG. 9, and to be able to determine the position of the heat transfer member 60 against the compressor 23 by securely combining the notch 64H and the installation part 235. Specifically, the notch 64H is formed by notching the lower part of the center part 641, and has the form to be combined with the installation part 235.

With the configuration, before the heat storage tank 40 is equipped in the compressor 23, the position of the heat transfer member 60 against the compressor 23 may be determined and a worker may install the heat transfer member 60 by him/herself in the manufacturing process. Furthermore, by installing the heat transfer member 60 before the heat storage tank 40, the heat transfer member 60 may serve as a guide in installing the heat storage tank 40, thereby further improving the workability.

Moreover, even if a force is applied to the lower part of the heat transfer member 60 due to e.g., an unexpected impact, variation of the position of the heat transfer member 60 may be prevented because the notch 64H and the installation part 235 are combined together.

Further, with the secure combination of the notch 64H and the installation part 235, the position of the connection member 64 against the compressor 23 may be determined, thereby enabling front, back, left, right, up and down positions of the respective heat transfer elements 60a, 60b against the compressor 23.

Moreover, it is desirable that the installation part 235 is an accumulator supporter to support the accumulator 22, as shown in FIG. 10.

This may allow an existing accumulator supporter already installed therein to be also used as the installation part 235 to install the heat transfer member 60.

Figure 11B:
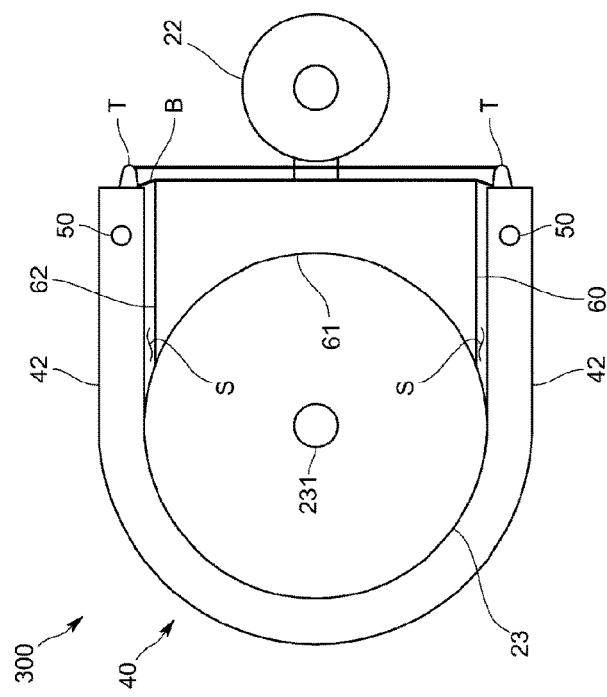

Furthermore, as shown in (a) and (b) of FIG. 11, while the heat transfer member 60 is arranged in the space S, a fixing member B, such as e.g., a band, may be configured to fix the heat transfer member 60 and heat storage tank 40 in a certain position.

More specifically, as shown in (a) and (b) of FIG. 11, the fixing member B is equipped in water-intake parts T installed on either end of the respective second elements 42 to be installed to run from one of the second elements 42 to the other, and press and fix the heat transfer member 60 to the compressor 23.

With the configuration, the fixing member B may press the heat transfer member 60 against the compressor 23 through the connection member 64, to ensure the heat emitted from the compressor 23 to be delivered to the heat storage tank 40.

Furthermore, the fixing member B pressing the heat transfer member 60 may secure adhesion between the compressor 23 and heat storage tank 40 and the heat transfer member 60 and maintain good heat transfer performance of the heat transfer member 60 for a long period of time.

Moreover, since the fixing member B presses the connection member 64 and fixes the heat storage tank 40, the fixing member B may put in the compressor to the heat transfer member 60 and the heat storage tank 40 from both sides, and since the force pressing the connection member 64 is strong, unnecessary gap is not formed between the heat storage tank 40 and the compressor 23.

With the configuration with the fixing member B, to further improve the workability, it is desirable to have projections 643 protruding outwardly from an outer face 64a of the connection member 64, as shown in FIG. 9.

More specifically, the projections 643 are formed on the upper and lower sides of the outer face 64a of the center part 641, and the fixing member B comes into contact with the outer face 64a between the upper and lower projections 643.

With the configuration, the fixing member B making contacts between the upper and lower projections 643 may determine a position of elevation of the heat transfer member 60.

For example, this may prevent a vertical position error because the fixing member B makes contacts between the upper and lower projections 643 even if a vertical force is applied to the heat transfer member 60 due to falling impact if the AC 100 equipped with the heat storage apparatus 300 falls.

Although the aforementioned configuration has the projections 643 formed on both upper and lower sides of the center part 641, a single projection 643 may be formed above the notch 64H, as shown in FIG. 12. By doing this, when the notch 64H is combined with the installation part 235, the projection 643 contacts the installation part 235 and prevents a position error of the connection member 64.

The connection member 64 is not limited to bending of a flat panel member, but for example, as shown in FIG. 13, may have the form in which the center part 641 is curved.

More specifically, the center part 641 may be formed according to the outer circumferential face 233 of the compressor 23.

This may press the inner side of the curved center part 641 against the outer circumferential face 233, allowing the connection member 64 to receive heat from the compressor 23 and deliver the heat to the heat transfer member 60 to assist with heat transfer of the heat transfer member 60.

Furthermore, as for a configuration to save the material cost of the heat transfer member 60 and effectively deliver the heat emitted from the compressor 23 to the heat storage tank 40, the heat transfer member 60 may have a thin plate 65 formed from one of two heat storage tank faced faces 62 to the other, as shown in FIG. 14.

Specifically, the heat transfer member 60 has a plurality of thin plates 65, and the thin plate is formed by being partially notched toward the compressor faced face 61 from the back face 63 of the heat transfer member 60.

Furthermore, for example, the thin plate may be configured to have a tiny hole formed in the heat transfer member along from one of the heat storage tank faces to the other.

As shown in FIG. 15, the heat transfer member may be configured to have a through hole 6x2 formed to bore through the heat transfer member in the direction of thickness and have a terminal installed on e.g., the outer circumferential face 233 of the compressor 23 or a wire connected to the terminal pulled out of the through hole 6x2.

Although the heat transfer member partially comes into contact with the outer circumferential face of the compressor in the embodiment, it may be configured to contact the top or bottom face of the compressor.

In this case, as a specific embodiment, the heat transfer member may have a top wall contacting the top face of the compressor or a bottom wall contacting the bottom face of the compressor.

This may enable the heat emitted from the compressor to be efficiently delivered to the heat storage tank.

The heat transfer member may be configured to have the position determined against the compressor by being combined with e.g., a bump formed on the top face or outer circumferential face of the compressor, or the inner circumferential face of the heat storage tank.

This may eliminate a gap between the compressor and the heat transfer member, thereby delivering the heat emitted from the compressor to the heat storage tank more efficiently.

Although the heat transfer member is formed not to contact the accumulator while being installed in the space S in the embodiment, a heat insulation member may be installed between the heat transfer member and the accumulator.

This may reduce heat loss from heat radiation from the heat transfer member to the accumulator.

Although the heat exchanger for heat storage of the embodiment is installed across the first and second elements of the heat storage tank, the other end opening 5x2 of the heat exchanger for heat storage 50 may be located on top of the heat transfer member 60 and some of a tubular member that forms the heat exchanger for hat storage 50 may be formed to pass the inside of the heat transfer member 60, as shown in FIG. 16.

This may enable heat exchange between the refrigerant and the heat transfer member 60 with a higher temperature than the heat storage tank 40 even if heat exchange of the refrigerant with a heat storage material is insufficient, and vaporize the refrigerant to flow into the compressor 23, thereby preventing malfunction of the compressor.

Furthermore, although the second heat transfer faces are continuously formed at both circumferential ends of the first heat transfer face in the embodiment, a second heat transfer face 421 may be continuously formed at one circumferential end of the first heat transfer face 411, as shown in FIG. 17. That is, the heat storage tank 40 in accordance with the present invention may have the shape of almost a letter 'J' when viewed from above.

This may miniaturize the heat storage tank 40, and thus install the heat storage tank 40 even in a type of device having a small machine room in which the outdoor unit is installed.

In this case, the connection member 64 may be configured to have a distance from the outer face 64*a* of the center part 641 to the inner face (i.e., one fixed side) of one end 642 different from a distance from the outer face 64*a* of the center part 641 to the inner face (i.e., the other fixed side) of the other end 642, as shown in FIG. 9. This may ensure the respective heat transfer elements 60*a*, 60*b* to be installed in the spaces S formed between the compressor 23 and various heat storage tanks 40 forming an asymmetric shape as described above.

Furthermore, although an angle formed by the both circumferential ends of the first heat transfer face with respect to the center axis of the compressor is almost 180 degrees while the heat storage tank is installed in the compressor in the embodiment, the angle may be less than 180 degrees.

This makes the area of the first heat transfer face smaller but improves workability if the heat storage tank is installed in the compressor.

Moreover, while the refrigeration circuit of the embodiment was configured such that the refrigerant flowing out from the heat storage tank flows into the compressor through the four-way valve, the refrigerant flowing out from the heat storage tank flows into the outdoor heat exchanger through e.g., the bypass pipe.

In addition, the heat storage apparatus of the embodiment is equipped in the compressor used in the refrigeration cycle of the AC, but it may also be equipped in a compressor used for any other refrigeration cycle, such as a water heater.

A method for assembling the heat storage apparatus 300 using the fixing member B will now be described with reference to FIGS. 18 and 19.

First, as shown in the top of FIG. 18, two heat transfer elements 60*a*, 60*b* are fixed to the connection member 64 with some bolts (not shown) and connected to each other.

The respective heat transfer elements 60*a*, 60*b* are formed to be equipped with the connection members 64 in their upper and lower parts, but here, only the upper part of the respective heat transfer elements 60*a*, 60*b* is first equipped with the first connection member 64.

Next, as shown in the bottom part of FIG. 18, the accumulator 22 is mounted on the accumulator supporter installed on the outer circumferential face 233 of the compressor 23, i.e., in the installation part 235. Specifically, for example, an installation band 221 is installed on the outer circumferential face of the accumulator 22 to install the accumulator 22, and the projection formed on the installation part 235 is put into a small hole formed in the installation band 221.

The notch 64H formed on the connection member 64 is then combined with the installation part 235 and the vertical position of the heat transfer member 60 is determined. Specifically, the connection member 64 is moved down from the upper part of the compressor 23 until the notch 64H is put in to the installation unit 235. At this time, it is desirable to adhere heat insulation sheets (not shown) to the compressor faced faces 61 of the respective heat transfer elements 60*a*, 60*b*. Instead of the heat insulation sheets, heat insulation grease may be used as well.

Subsequently, the second connection member 64 different from the first connection member 64 is mounted on the lower part of the heat transfer elements 60*a*, 60*b*.

Next, as shown in FIG. 19, heat storage tank 40 is installed in the compressor 23. Specifically, the heat storage tank 40 is slid horizontally from the opposite side of the heat transfer member 60 to the compressor 23 such that the compressor 23 is enclosed by the heat storage tank 40 and the heat transfer member 60. At this time, the heat storage tank 40 determines the positions of the respective parts (not shown) of the compressor 23.

The respective heat transfer elements 60*a*, 60*b* serve as guides for sliding of the heat storage tank 40, so that the first heat transfer face 411 of the heat storage tank 40 comes into contact with the outer circumferential face 233 of the compressor 23 and as a result, the respective heat transfer elements 60*a*, 60*b* are installed in the spaces S formed between the compressor 23 and the heat storage tank 40.

In this state, the heat storage tank 40 and the heat transfer member 60 are fixed by a plurality of fixing members B to the compressor 23. Specifically, as shown in FIG. 19, at least one fixing member B contacts the outer circumferential face 64*a* of the connection member 64 between the upper projection 643 and the lower projection 643 to press the connection member 64 toward the compressor.

Here, three fixing members B are used. A first fixing member B is built in the water intake part T installed at each end of the respective second elements 42 of the heat storage tank 40 to come into contact with the connection member 64 and be pivoted on the outer circumferential face of the accumulator 22. A second fixing member B is built in the water intake part T to be pivoted on the outer circumferential face of the accumulator 22. A third fixing member B comes into contact with the connection member 64 and is pivoted on the outer circumferential face of the heat storage tank 40.

Finally, as described above, the heat storage apparatus 300 may be assembled by introducing a heat storage member (not shown), putting the heat exchanger for heat storage 50 to the heat storage tank 40 and closing the heat storage tank 40 with a lid member (not shown) while the heat storage tank 40 and the heat transfer member 60 are fixed to the compressor 23.

According to the assembling method, the connection member 64 may be combined to the installation part 235 installed in the compressor 23 from above, so the worker may easily position the heat transfer member 60 in the compressor 23 by him/herself.

Furthermore, since the connection member 64 is positioned earlier than the heat storage tank 40, the respective heat transfer elements 60*a*, 60*b* may serve as guides for the heat storage tank 40 to be installed in the compressor 23, thereby improving the workability.

Moreover, since the fixing member B presses the connection member 64 toward the compressor, and thus the heat transfer member 60 presses the heat storage tank 40 and the compressor 23, adhesion of the heat transfer member 60 against the heat storage tank 40 and the compressor 23 may be secured, thereby maintaining heat transfer performance of the heat transfer member 60 for a long period of time.

The present invention is not limited to the above embodiment, but may be modified in various ways as long as it does not deviate from the purpose of the invention.

Next, a second embodiment of an AC according to the present invention will be described.

In the second embodiment, the AC replaces the heat transfer member of the first embodiment with an auxiliary heat capacity member, and in the following description, the auxiliary heat capacity member of the second embodiment will be focused to explain a difference from the first embodiment.

The specific embodiment of the auxiliary heat capacity member of the second embodiment is denoted by reference numeral 60, which is referred to in the first embodiment.

The auxiliary heat capacity member of the second embodiment constitutes the heat storage apparatus with the heat storage tank or the heat exchanger for heat storage and is interposed between the compressor and the heat storage tank to increase heat capacity of the compressor.

While the heat transfer member of the first embodiment is formed of a high heat conductive material, the auxiliary heat capacity member may have large heat capacity per volume and have high thermal diffusivity to be efficiently heated by the heat emitted from the compressor.

Specifically, this has the form of a body of a stuffed block formed of a metal, and has higher heat diffusivity than e.g., antifreeze, which is the heat storage member. More preferably, it is good to have heat diffusivity more than 100 times higher than the antifreeze.

For such a material, for example, there may be a metal with more than $1.0 \times 0^{-5}$ m$^2$/s of heat diffusivity, which is, specifically, aluminum, steel, carbon steel, chrome steel, tungsten steel, manganese steel, copper, aluminum bronze, brass, nickel, chrome, cobalt, palladium, etc.

Among the metals, copper may be desirable in terms of heat capacity per volume and heat diffusivity, and aluminum may be desirable in consideration of material cost or weight.

According to the AC of the second embodiment, some of the heat emitted from the compressor is delivered to the auxiliary heat capacity member, increasing the temperature of the auxiliary heat capacity member up to almost the same temperature as that of the compressor. Due to this, an apparent heat capacity of the compressor corresponds to the sum of heat capacity of the compressor itself and heat capacity of the auxiliary heat capacity member.

The heat storage tank equipped with the auxiliary heat capacity member has no need to be miniaturized to be mounted on the compressor and the auxiliary heat capacity member, even if the compressor is small in size, thereby efficiently storing the heat emitted from the compressor and auxiliary heat capacity member.

Furthermore, since the auxiliary heat capacity member is formed of a metal with heat diffusivity of more than $1.0 \times 0^{-5}$ m$^2$/s, the auxiliary heat capacity member may be heated up to almost the same temperature as that of the compressor in a short period of time, which enables the heat to flow from the auxiliary heat capacity member to the heat storage tank in a case that the heat stored in the heat storage tank is insufficient, thereby efficiently storing the heat.

Moreover, the heat may be delivered from the compressor to the auxiliary heat capacity member, thereby preventing excessive rise in temperature of the compressor and operating the compressor within a proper temperature range especially when the compressor is small and there is a heavy load.

The auxiliary heat capacity member may be formed of a plurality of materials combined.

More specifically, it is desirable to use a material with high heat conductivity or high heat diffusivity and a material with a high heat capacity or high specific heat for the auxiliary heat capacity member, and specifically, for example, a combination of high heat conductive aluminum and high heat capacitive water may be used for the auxiliary heat capacity member.

Furthermore, for specific configuration, water being contained in a circumferential wall part formed of aluminum may be taken as an example.

A particular form and orientation is focused in describing a heat storage apparatus and air conditioner having the same with reference to accompanying drawings, but a person of ordinary skill in the art will understand and appreciate that various modifications can be made without departing the scope of the present disclosure. Thus, it will be apparent to those ordinary skilled in the art that the disclosure is not limited to the embodiments described, which have been provided only for illustrative purposes.

The invention claimed is:

1. An air conditioner comprising a heat storage apparatus for storing heat emitted from a compressor arranged in an outdoor unit,
   wherein the heat storage apparatus comprises
   a heat storage tank installed in the compressor for storing heat emitted from the compressor; and
   a heat transfer member configured to deliver heat emitted from the compressor to the heat storage tank,
   wherein the heat storage tank comprises
   a first heat transfer face configured to have a form corresponding to a part of an outer circumferential face of the compressor to come into contact with the outer circumferential face of the compressor; and
   a pair of second heat transfer faces configured to extend from both ends of the first heat transfer face to be in parallel to each other and form space with the outer circumferential face of the compressor, and
   wherein the heat transfer member is arranged in the space.

2. The air conditioner of claim 1,
   wherein the first heat transfer face is formed to come into contact with less than half of the outer circumferential face of the compressor.

3. The air conditioner of claim 2,
   wherein a gap between the pair of second heat transfer faces is larger than diameter of the compressor.

4. The air conditioner of claim 3,
   wherein the heat transfer member comprises a compressor faced face arranged to face the outer circumferential face of the compressor for receiving heat emitted from the compressor, and a pair of heat storage tank faced faces arranged to face the pair of second heat transfer faces for delivering the heat received through the compressor faced face to the heat storage tank, and
   wherein the compressor faced face faces a part of the outer circumferential face of the compressor between the pair of second heat transfer faces while the heat storage tank is installed in the compressor.

5. The air conditioner of claim 4,
   wherein an accumulator is installed in an inlet pipe through which a refrigerant flows into the compressor, and
   wherein the heat transfer member is arranged in the space to be apart from the accumulator.

6. The air conditioner of claim 4,
   wherein the heat transfer member is configured to have a thin plate formed along a side to another of the pair of heat storage tank faced faces.

7. The air conditioner of claim 1,
   wherein the heat transfer member is comprised of a plurality of heat transfer elements equipped in the compressor in the space.

8. The air conditioner of claim 7,
wherein the heat transfer member further comprises a connection member connecting the plurality of heat transfer elements.

9. The air conditioner of claim 8,
wherein the connection member is mounted on an installation part installed on the outer circumferential face of the compressor for allowing the plurality of heat transfer elements to be positioned against the compressor.

10. The air conditioner of claim 9,
wherein the plurality of heat transfer elements are fixed to the connection member by bolts.

11. The air conditioner of claim 10,
wherein the connection member comprises a plurality of through holes through which the bolts pass, and at least one of the plurality of through holes has the form of a slit-shaped ellipse.

12. The air conditioner of claim 11,
wherein the connection member comprises a projection protruding outwardly from an opposite face of the face to which the plurality of heat transfer elements are fixed, and a notch formed below the projection, and
wherein the notch is combined with the installation part to position the connection member against the compressor.

13. The air conditioner of claim 12,
wherein the accumulator is supported against the installation part installed on the outer circumferential face of the compressor.

14. The air conditioner of claim 13,
further comprising: a fixing member to fix the heat transfer member and the heat storage tank, wherein the fixing member presses the heat transfer member toward the compressor to adhere the heat storage tank and heat transfer member to the compressor.

15. The air conditioner of claim 14,
wherein the projection comprises upper and lower projections and the fixing member makes contacts between the upper and lower projections to press the connection member toward the compressor and press the heat transfer member toward the compressor by the connection member pressed toward the compressor.

16. The air conditioner of claim 1,
wherein the heat transfer member is a metal with heat conductivity of more than 50 W/mK.

17. The air conditioner of claim 1,
wherein a heat exchanger for heat storage formed of a member in the shape of a pipe in the heat storage tank for allowing a refrigerant flowing inside to change heat with a heat storage member contained in the heat storage tank is arranged, and a part of the pipe forming the heat exchanger for heat storage passes through the inside of the heat transfer member.

18. A heat storage apparatus comprising:
a heat storage tank installed in a compressor for storing heat emitted from the compressor; and
a heat transfer member configured to deliver heat emitted from the compressor to the heat storage tank,
wherein the heat storage tank comprises
a first heat transfer face configured to have a form corresponding to a part of an outer circumferential face of the compressor to come into contact with the outer circumferential face of the compressor; and
a pair of second heat transfer faces configured to extend from both ends of the first heat transfer face to be in parallel to each other and form space with the outer circumferential face of the compressor, and
wherein the heat transfer member is arranged in the space.

19. A heat storage apparatus comprising:
a heat storage tank installed in a compressor for storing heat emitted from the compressor; and
an auxiliary heat capacity member configured to receive heat emitted from the compressor to increase heat capacity of the compressor,
wherein the heat storage tank comprises
a first heat transfer face configured to have a form corresponding to a part of an outer circumferential face of the compressor to come into contact with the outer circumferential face of the compressor; and
a pair of second heat transfer faces configured to extend from both ends of the first heat transfer face to be in parallel to each other and form space with the outer circumferential face of the compressor, and
wherein the auxiliary heat capacity member is arranged in the space.

20. The heat storage apparatus of claim 19,
wherein the auxiliary heat capacity member has heat diffusivity of more than $1.0 \times 0^{-5}$ m$^2$/s.

* * * * *